Patented May 10, 1932

1,857,548

UNITED STATES PATENT OFFICE

CHAD H. HUMPHRIES, OF INDIANAPOLIS, INDIANA, ASSIGNOR TO METALS PROTECTION CORPORATION, OF INDIANAPOLIS, INDIANA, A CORPORATION OF INDIANA

TECHNICALLY PURE $CrO_3$

No Drawing.   Application filed March 3, 1928.   Serial No. 258,993.

This invention relates to technically pure $CrO_3$; and it comprises as a new composition of matter crude dry $CrO_3$ containing $SO_4''$ as an impurity and admixed with a dry reactive barium compound, such as barium hydroxid or barium carbonate, in amount corresponding to said $SO_4''$; all as more fully hereinafter set forth and as claimed.

Commercial "chromic acid" is chromium trioxid, $CrO_3$. It is used in various arts and particularly in making electrolytic baths for plating chromium. The usual bath for this purpose consists of a solution of $CrO_3$ containing minor but definite amounts of $Cr_2O_3$ and of $SO_4''$. As chromium is plated out, replenishment is by addition of $CrO_3$.

In the factory $CrO_3$ is made by adding sulfuric acid to a strong solution of a bichromate, usually sodium bichromate, whereupon most of the $CrO_3$ set free precipitates as red crystals in a mother liquid containing sulfuric acid and an acid sulfate; usually acid sodium sulfate. Dry commercial $CrO_3$ is ordinarily made by removing the mother liquor as completely as possible and then drying the $CrO_3$ by heat. In so drying most of the retained sulfuric acid is fumed off. In so doing however there is a limit to the temperature which can be used since the $CrO_3$ tends to dissociate. The longer the heating or the higher the temperature, the more complete is the removal of sulfuric acid but the greater the danger of breaking up $CrO_3$ and making a product not completely soluble in water. As actually made, technical $CrO_3$ always contains residual sulfuric acid in some amount. And it may contain acid sodium sulfate as well. In ordinary grades of $CrO_3$ the sulfuric acid may vary from 1.5 per cent $SO_3$ to 0.15 per cent. As noted however with low proportions of sulfuric acid there is apt to be reduced $CrO_3$ present produced by overheating in drying; and the preparation may be not completely soluble in cold water.

For purposes where chemically pure $CrO_3$ is required the presence of either $Cr_2O_3$ or of sulfuric acid is naturally objectionable, and both are undesirable in $CrO_3$ used for replenishment of plating baths. Both must be present but be present in definite amounts in such a bath, and additions of either are undesirable. If sulfuric acid occurs in the replenishing $CrO_3$, the $SO_4''$ content of the bath builds up above the desirable amount.

There is commercially available a purer grade of $CrO_3$ termed C. P. made by a rather laborious and expensive process wherein the sulfuric acid in wet precipitated crystallized $CrO_3$ made as above described is first displaced by a strong solution of nitric acid (in which $CrO_3$ is not very soluble) this being in turn displaced by a saturated water solution of $CrO_3$. This C. P. grade of $CrO_3$ is however too expensive for all ordinary uses, and in particular for replenishing chrome plating baths.

It is the purpose of the present invention to provide a simple and ready means for producing chemically pure $CrO_3$ solutions from crude technical $CrO_3$. To this end, the wet precipitated, crystallized $CrO_3$ made in the ordinary way is freed of mother liquor by suction or by a centrifugal as completely as possible and is then dried in heated pans in the usual way. In drying, most of the moisture and some of the sulfuric acid are fumed off. Where absence of sodium compounds is desired the mother liquor of the crystal magma may be displaced by sulfuric acid prior to draining. In drying the $CrO_3$ the temperature is kept below that at which the $CrO_3$ will dissociate, so that the dried product is all soluble in cold water. The last traces of sulfuric acid are of course the hardest to remove; and in material made for use in the present invention, it is not necessary to carry the temperature as high or heat as long as in the ordinary methods since residual sulfuric acid is taken care of in another way. After a dry material has been produced, it is analyzed to ascertain the amount of sulfuric acid, or $SO_4''$ ion, present and is then admixed with dry barium hydroxid or carbonate in an amount corresponding to this content of $SO_4''$ ion. The dry mixture can then be packaged and stored indefinitely. On placing in water, the barium compound and the sulfuric acid react to form a precipitate of insoluble barium sulfate which can be settled out or be filtered out if necessary or desired, giving a clean, chemically pure solution of chromic acid. Barium sulfate being wholly inert as regards most chemical reagents the presence of suspended sulfate is often immaterial and in such cases simple settling out of the bulk of the precipitate may be sufficient.

The composite preparation made as described can be prepared cheaply and gives pure $CrO_3$ solutions on contact with water.

I find on the whole barium hydroxid is best adapted for my purposes. However, dry barium carbonate or barium chromate may be used. Barium hydroxid and chromate have the advantage that in the event of access of moisture to the packaged material and any deliquescence of the $CrO_3$, there will be no evolution of gas as in the case of the use of barium carbonate.

For some purposes, as in chrome plating, as stated, a definite and ascertained amount of sulfuric acid is desired in the bath. Where there is any object in producing $CrO_3$ for replenishment containing a low but definite content of $SO_4''$ ion, this can be done by adding merely enough barium compound to correspond with the excess of sulfuric acid above the desired maximum quantity. For example, some users specify a $CrO_3$ containing $SO_4''$ in not more than 0.15 per cent. A preparation taking this exact amount of sulfuric acid into solution can be readily prepared under the present invention. It is however simpler to add the amount of barium carbonate corresponding to all the sulfuric acid present and let the user put the amount of sulfuric acid which he wants in the $CrO_3$ solution he makes.

An excess of barium compound over and above the amount corresponding to the $SO_4''$ ion is usually unnecessary and adds only to the expense. However, the presence of the excess does not interfere in most cases with the production of a C. P. solution of $CrO_3$ since the excess barium carbonate forms insoluble barium chromate.

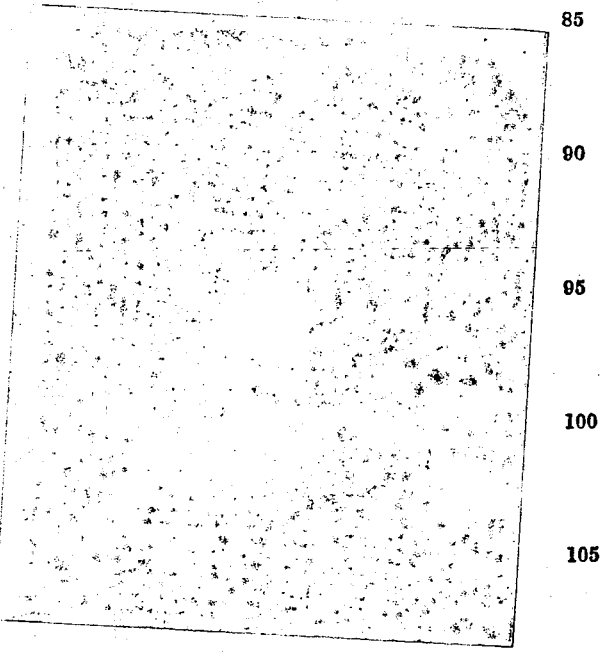

What I claim is:—

1. As a new composition of matter for making substantially pure solutions of $CrO_3$ on addition of water, a dry mixture of crude $CrO_3$ containing $SO_4''$ ion as an impurity and a reactive barium compound, said barium compound being present in an amount corresponding to the amount of $SO_4''$ present.

2. As a new composition of matter for making substantially pure solutions of $CrO_3$ on addition of water, a dry mixture of crude $CrO_3$ containing $SO_4''$ ion as an impurity and barium hydroxid, said barium hydroxid being present in an amount corresponding to the amount of $SO_4''$ present.

3. In the production of pure aqueous solutions of $CrO_3$, the process which comprises dry mixing technical $CrO_3$ with a small quantity of a water soluble dry barium compound sufficient in amount to be equivalent to the $SO_4''$ impurity present in said technical $CrO_3$, and thereafter dissolving said mixture in water.

4. In the production of a composition capable of dissolving in water to a pure $CrO_3$ solution, the process which comprises precipitating $CrO_3$ by adding sulfuric acid to a solution of a soluble chromate, removing the mother liquor; drying the recovered $CrO_3$ and thereafter adding to the dry $CrO_3$ sufficient dry soluble barium compound to precipitate any residual sulfate contained in the recovered $CrO_3$.

In testimony whereof, I have hereunto affixed my signature.

CHAD H. HUMPHRIES.